US009518560B2

(12) United States Patent
Creaby

(10) Patent No.: US 9,518,560 B2
(45) Date of Patent: Dec. 13, 2016

(54) METHOD TO INDIVIDUALLY OPTIMIZE RESPECTIVE PITCH ANGLES OF A PLURALITY OF BLADES IN A WIND TURBINE

(71) Applicant: Justin Creaby, Westminster, CO (US)

(72) Inventor: Justin Creaby, Westminster, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 846 days.

(21) Appl. No.: 13/903,180

(22) Filed: May 28, 2013

(65) Prior Publication Data

US 2014/0356161 A1    Dec. 4, 2014

(51) Int. Cl.
    *F03D 7/02*    (2006.01)
(52) U.S. Cl.
    CPC ............ *F03D 7/0224* (2013.01); *Y02E 10/723* (2013.01)
(58) Field of Classification Search
    CPC ........ F03D 7/022; F03D 7/0224; F03D 7/024; F03D 7/04; F03D 7/042; F03D 7/043; F03D 7/044; F03D 7/045; F03D 7/046; Y02E 10/723; F05B 2270/701; F05B 2270/702; F05B 2270/703; F05B 2270/704; F05B 2270/705; F05B 2270/706
    USPC ................................................. 700/295–297
    See application file for complete search history.

(56) References Cited

U.S. PATENT DOCUMENTS

| 2,795,285 | A | * | 6/1957 | Champney | ............... | B63H 3/10 318/433 |
| 4,160,170 | A | * | 7/1979 | Harner | .................. | F03D 7/0224 290/44 |
| 4,161,658 | A | * | 7/1979 | Patrick | .................. | F03D 7/0224 290/44 |
| 4,189,648 | A | * | 2/1980 | Harner | .................. | F03D 7/0224 290/44 |
| 4,193,005 | A | * | 3/1980 | Kos | ........................ | F03D 7/0224 290/44 |

(Continued)

OTHER PUBLICATIONS

CN 103032265, Apr. 10, 2013, English Machine Translation, Translated by ProQuest Apr. 19, 2016.*

(Continued)

*Primary Examiner* — Ninh H Nguyen
*Assistant Examiner* — Wayne A Lambert

(57) ABSTRACT

A method to individually optimize respective pitch angles of blades in a wind turbine. The method allows supplying (102) a modulation signal to modulate a pitch angle of the individual blade being optimized. The method further allows filtering (104) output power of the turbine subject to the modulating frequency to extract a power signal in a frequency spectrum including the modulating frequency. The extracted power signal and a demodulation signal are mixed (106) to generate a signal including a product of the extracted power signal and the demodulation signal. The generated signal is filtered (108) to remove the modulating frequency and extract a gradient signal effective to search a pitch angle estimate conducive to optimize output power of the turbine. The gradient signal may be integrated (110) to cause the gradient signal to converge towards an optimal pitch angle for the individual blade being optimized.

20 Claims, 4 Drawing Sheets

(56) References Cited

U.S. PATENT DOCUMENTS

| | | | | |
|---|---|---|---|---|
| 4,339,666 A * | 7/1982 | Patrick | F03D 7/0224 | 290/44 |
| 4,400,659 A * | 8/1983 | Barron | F03D 7/0272 | 322/23 |
| 4,426,192 A * | 1/1984 | Chertok | F03D 7/0224 | 416/1 |
| 4,435,647 A * | 3/1984 | Harner | F03D 7/0224 | 290/44 |
| 4,700,081 A * | 10/1987 | Kos | F03D 7/0272 | 290/44 |
| 7,004,724 B2 * | 2/2006 | Pierce | F03D 7/0204 | 415/118 |
| 7,417,332 B2 * | 8/2008 | Malakhova | F03D 7/047 | 290/44 |
| 7,445,431 B2 * | 11/2008 | Larsen | F03D 7/022 | 416/1 |
| 7,452,185 B2 * | 11/2008 | Ide | F03D 7/0224 | 416/35 |
| 7,692,322 B2 * | 4/2010 | Wakasa | F03D 7/0224 | 290/44 |
| 2003/0151259 A1 * | 8/2003 | Feddersen | F03D 7/0224 | 290/44 |
| 2006/0033338 A1 * | 2/2006 | Wilson | F03D 1/0608 | 290/44 |
| 2006/0066111 A1 * | 3/2006 | Suryanarayanan | F03D 7/0272 | 290/44 |
| 2006/0113801 A1 * | 6/2006 | Schubert | F03D 1/003 | 290/44 |
| 2007/0041837 A1 * | 2/2007 | Ide | F03D 7/0224 | 416/147 |
| 2007/0120369 A1 * | 5/2007 | Delmerico | F03D 7/0272 | 290/44 |
| 2009/0316523 A1 * | 12/2009 | Ross | G01V 1/38 | 367/15 |
| 2010/0013235 A1 * | 1/2010 | Bjerge | F03D 7/0272 | 290/55 |
| 2010/0111693 A1 * | 5/2010 | Wilson | F03D 7/0224 | 416/1 |
| 2010/0209243 A1 * | 8/2010 | Birkemose | F03D 7/0296 | 416/1 |

OTHER PUBLICATIONS

Justin Creaby et al., "Maximizing Wind Turbine Energy Capture Using Multivariable Extremum Seeking Control", Wind Engineering, Multi Science Publishing, ISSN 0309-524X, vol. 33, No. 4/Jun. 2009, pp. 1-39, DOI 10.1260/030952409789685753.

S.-J. Liu et al., "Introducion to Extremum Seeking", Stochastic Averaging and Stochastic Extremum Seeking, Communications and Control Engineering, pp. 11-20, DOI 10.1007/978-1-4471-4087-0_2, © Springer-Verlag London 2012.

Benjamin Biegel et al., "Wind Turbine Pitch Optimization", 2011 IEEE International Conference on Control Applications (CCA) Part of 2011 IEEE Multi-Conference on Systems and Control, pp. 1327-1334, 978-1-4577-1061-2/11, Denver, CO, USA, Sep. 28-30, 2011.

* cited by examiner

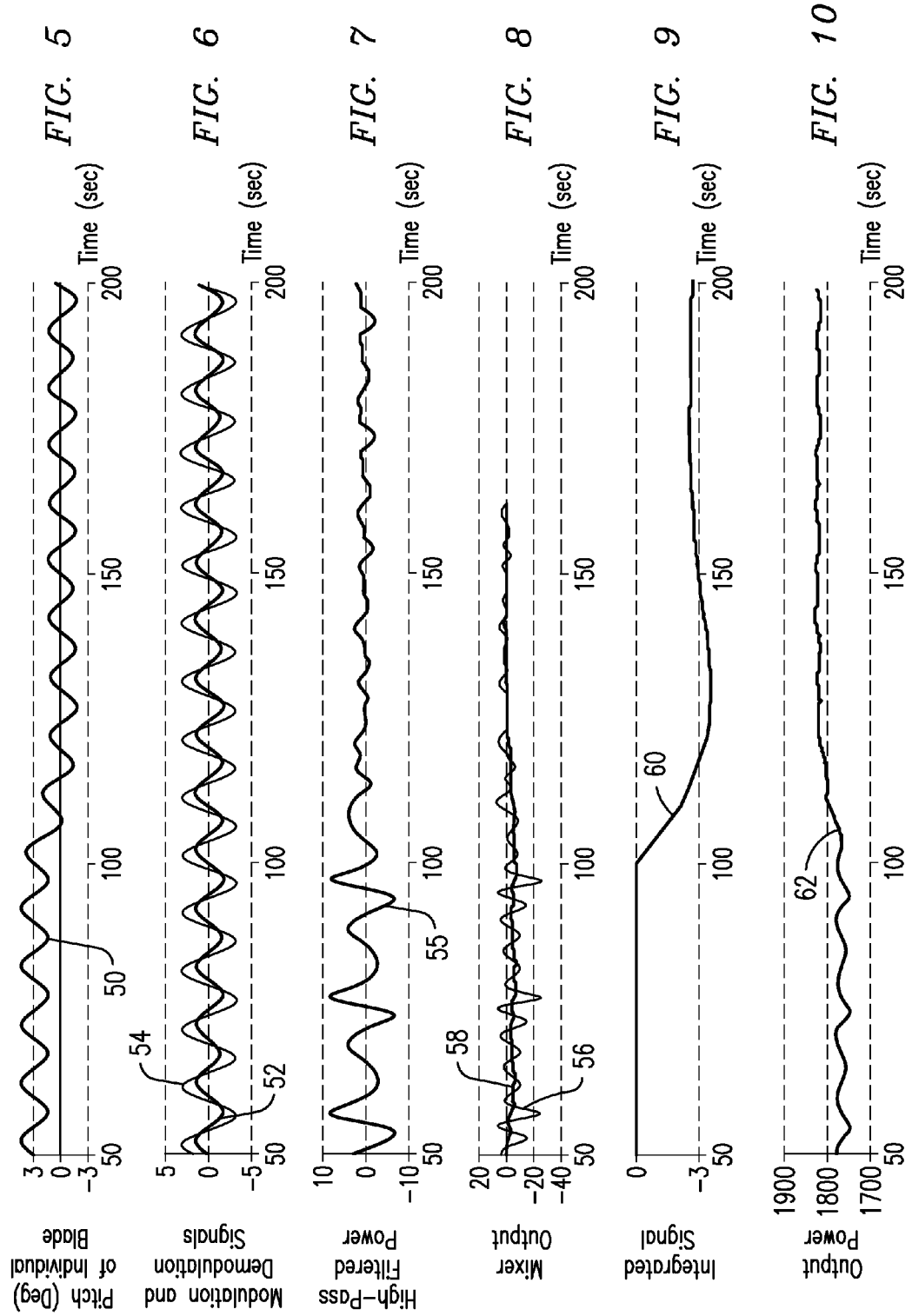

METHOD TO INDIVIDUALLY OPTIMIZE RESPECTIVE PITCH ANGLES OF A PLURALITY OF BLADES IN A WIND TURBINE

FIELD OF THE INVENTION

The present invention is related to wind turbines for generating electric power, and, more particularly, to adaptive control techniques for individually optimizing respective pitch angles of a plurality of blades in a wind turbine.

BACKGROUND OF THE INVENTION

Renewable energy has become a major focus for energy and environment sustainability. Wind is an example of an appropriate energy source for utility-level power generation. The power generation for wind turbines may be substantially affected by the aerodynamic characteristics of wind-turbine interaction, such as blade pitch angle. Individual blades in a wind turbine may have different optimum pitch angle settings due to variations that may occur during the manufacturing and/or the installation of the individual blades. It is known that upon turbine commissioning, each blade may be manually calibrated to remove this potential error, but this generally entails burdensome and/or time-consuming tasks. Additionally, over time it is possible that the pitch angle setting obtained from such calibration may no longer be optimal due to various conditions that may affect the blades, such as dirt, ice, wear, etc.

BRIEF DESCRIPTION OF THE DRAWINGS

The invention is explained in the following description in view of the drawings that show:

FIGS. 5-10 respectively illustrate plots of example signals that may be helpful to conceptualize aspects of a method embodying aspects of the present invention.

DETAILED DESCRIPTION OF THE INVENTION

Figure 1:
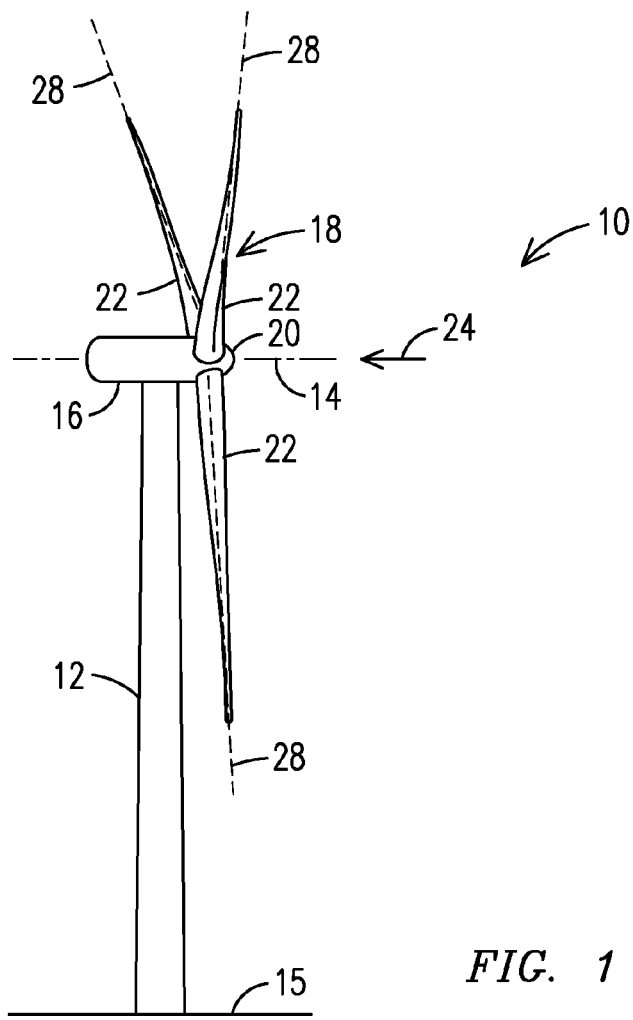
FIG. 1 is a perspective side view of an example wind turbine that may benefit from aspects of the present invention.

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description, well known methods, procedures, and components have not been described in detail.

Furthermore, various operations may be described as multiple discrete steps performed in a manner that is helpful for understanding embodiments of the present invention. However, the order of description should not be construed s to imply that these operations need be performed in the order they are presented, nor that they are even order dependent. Repeated usage of the phrase "in one embodiment" does not necessarily refer to the same embodiment, although it may.

It is known to adjust the pitch of the blades of a wind turbine in response to changing environmental conditions. However, such adjustments change the pitch of all of the blades of the turbine at the same time and by the same amount. The present inventor has thus recognized that it would be desirable to provide reliable and cost-effective adaptive control techniques arranged to individually optimize respective pitch angles of a plurality of blades in a wind turbine, since optimization for the group of blades most often misses the optimization of any given one of the individual blades due to variations between blades. If an individual blade optimization technique can be automated, it can be applied to the turbine as often as changing conditions dictate to ensure that the turbine operates at its highest efficiency. To accomplish this improvement, the inventor induces a modulation with a known signature (e.g. frequency or other pattern) to the pitch angle of one blade and then monitors the change in power produced by the turbine to extract information regarding the effect of the modulation. The inventor has recognized that the signature of a blade pitch modulation is reflected in the change in the power output signal of the turbine, and that the magnitude of the reflected signature will change depending upon how far the blade is from its optimal pitch angle. When a blade is at a non-optimal pitch, the modulation will produce a variation in the power output signal, and that variation will have a slope relative to the modulation that reflects whether the blade has too much pitch angle or too little pitch angle. Furthermore, an integral of that variation will become smaller and will approach zero as the actual pitch angle of the one blade approaches the optimal pitch angle for that specific blade. The extracted slope information provides information for adjusting the pitch angle to a more optimal position and for recognizing an optimal position for that blade once it is obtained. This method can be applied to each blade individually and sequentially to achieve an overall optimization for the wind turbine. Alternatively, because the modulation frequency is recognizable in the power output signal, it can be applied simultaneously to multiple blades by modulating the pitch angle of each respective blade at a distinct modulating signature, thereby providing an individual optimal pitch solution for each specific blade.

FIG. 1 is a perspective side view of an example wind turbine 10 that may benefit from aspects of the present invention. In this example embodiment, wind turbine 10 is a horizontal axis wind turbine. Alternatively, wind turbine 10 may be a vertical axis wind turbine. Wind turbine 10 may include a tower 12 that may extend from a supporting surface 15, a nacelle 16 coupled to tower 12, and a rotor 18 coupled to nacelle 16. Rotor 18 includes a rotatable hub 20 and a plurality of rotor blades 22 coupled to hub 20. In this example embodiment, rotor 18 has three rotor blades 22. It will be appreciated that rotor 18 may have any number of rotor blades 22 that enables wind turbine 10 to function as described herein.

As wind (schematically represented by arrow 24) strikes each rotor blade 22, lift forces are induced on each rotor blade 22 and rotation of rotor 18 about a rotation axis 14 is induced as each rotor blade 22 is accelerated. A pitch angle of rotor blades 22, i.e., an angle that determines a perspective of each rotor blade 22 with respect to the direction of wind 24, may be controlled in response to a pitch control system 30 (FIG. 2) embodying aspects of the present invention. For example, increasing pitch angle of a given rotor blade may decrease a blade surface area (e.g., lowers the airfoil angle of attack and thus may lower the lift force exerted on the blade) of the given rotor blade. Conversely, decreasing a pitch angle of a given blade may increase the blade surface area (e.g., may increase the airfoil angle of attack and thus increases the lift force in the absence of stall) of the blade. A pitch angle of rotor blades may be adjusted about a pitch axis 28 for each blade 22. In one preferred embodiment, the pitch angles of rotor blades may be controlled individually.

Figure 2:
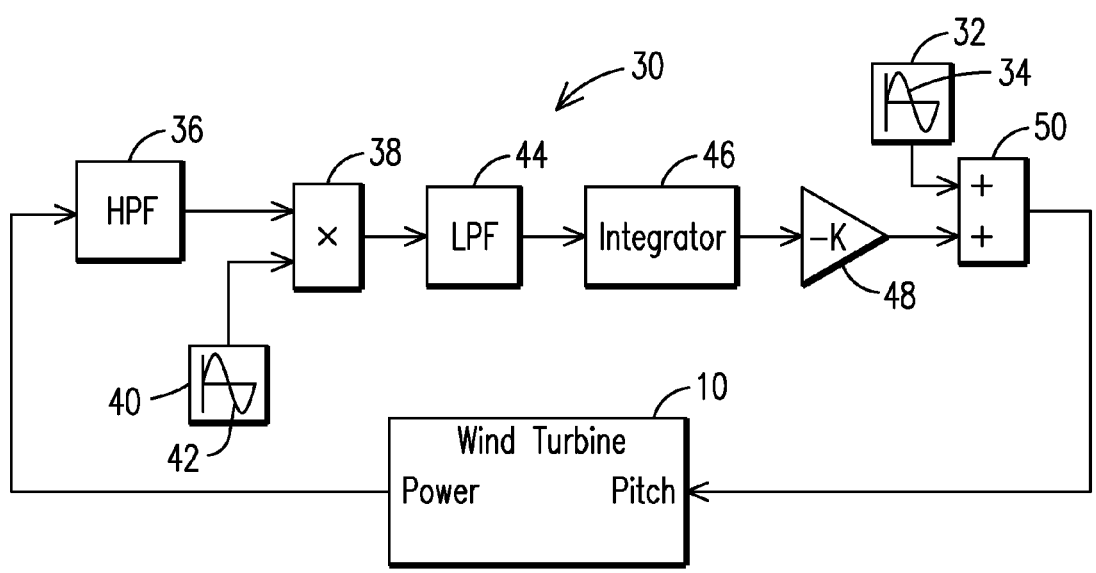
FIG. 2 is a block diagram of an example embodiment of a pitch control system embodying aspects of the present invention.

FIG. 2 is a block diagram of a pitch control system 30 embodying aspects of the present invention. In one example embodiment, pitch control system 30 may be effective to perform a method to individually optimize respective pitch angles of a plurality of blades in a wind turbine. A modulator 32 may be coupled to supply to an adder 50 a modulation signal 34 having a predefined modulating frequency (e.g., frequency f1) to modulate at the modulating frequency a pitch angle of a respective one of the plurality of blades being presently optimized. In one example embodiment, modulation signal 34 may be a sinusoid. It will be appreciated, however, that any periodic signal (triangular wave, square wave, etc.), or even random signals may be effectively utilized to modulate the pitch angle of the blade being optimized. As a practical consideration, in one example embodiment the frequency of the modulation frequency may be selected to be proximate to a time constant of the rotor. For example, presuming the time constant of the rotor is 8 seconds, then the modulating frequency may be chosen to be approximately ⅛=0.125 Hz. It will be appreciated that numerical examples that may be described throughout this disclosure should be construed in an example sense and not in a limiting sense since inventive aspects of the present invention are in no way restricted to any specific numerical example.

In one example embodiment, a high-pass filter 36 (labeled HPF) may be coupled to filter output power of wind turbine 10 subject to the modulating frequency to extract a power signal (e.g., free of a DC component) in a frequency spectrum comprising at least the modulating frequency. For example, high-pass filter 36 may be set to pass at least the modulating frequency f1.

In one example embodiment, a mixer 38 may be coupled to high-pass filter 36 to mix the power signal extracted from high-pass filter 36 and a demodulation signal 42 (e.g., as may be obtained from a demodulator 40) oscillating at the modulating frequency (e.g., at frequency f1) to generate a signal comprising a product of the extracted power signal and the demodulation signal.

In one example embodiment, a difference in a phase angle (e.g., a lead or lag) of the extracted power signal relative to a phase angle of the demodulating signal may be estimated or otherwise measured to appropriately compensate for any such phase angle difference. This would allow providing a substantially in-phase relationship between the extracted power signal and the demodulation signal. That is, the phase of demodulation signal 42 should be substantially aligned (e.g., to be in phase or 180 degrees out-of-phase) relative to the phase of the filtered power signal extracted by high-pass filter 36. The phase angle shift (e.g., lead or lag) which may be experienced by the pitch signal may be measured using any appropriate technique, such as measuring the lead/lag from the peak (or through) of the pitch signal to the peak (or through) of the filtered power signal.

In one example embodiment, a low-pass filter 44 (labeled LPF) may be coupled to filter the signal generated by mixer 38 to remove at least the modulating frequency and extract a gradient signal effective to search a pitch angle estimate conducive to optimize output power of the turbine. As a practical consideration, in one example embodiment, low-pass filter 44 may be set to have a cutoff frequency at approximately half the modulating frequency f1. In one example embodiment, an integrator 46 may be coupled to integrate the gradient signal to cause the gradient signal to converge towards a value indicative of an optimal pitch angle for the respective one of the plurality of blades being presently optimized. In one example embodiment, a gain 48 (labeled K) may be applied to the output from integrator 46 prior to being combined in adder 50 with modulation signal 34. Adjusting gain 48 allows varying how fast the pitch may be adapted. One should start with a relatively low gain to prevent instability. The gain may be gradually increased to accommodate a faster convergence.

It will be appreciated by those skilled in the art that the foregoing concept of utilizing a gradient signal effective to search a pitch angle estimate conducive to optimize output power of the turbine is one example application of a self-optimizing control strategy based on Extremum Seeking Control (ESC). As will be appreciated by those skilled in the art, this is a self-optimizing control strategy effective to search for unknown and/or time-varying input parameters (e.g., pitch angle setting) for optimizing a performance index (e.g., power output of the wind turbine). ESC can be considered as a dynamic realization of the gradient search through the usage of a modulating (e.g., dithering) signal. For readers desirous of general background information regarding ESC, reference is made to Chapter 2 (*Introduction to Extremum Seeking*) of textbook titled *Stochastic Averaging and Stochastic Extremum Seeking*, Communications and Control Engineering, by S. J. Liu and M. Krstic, ©Springer-Verlag London 2012, which is herein incorporated by reference.

Figure 3:
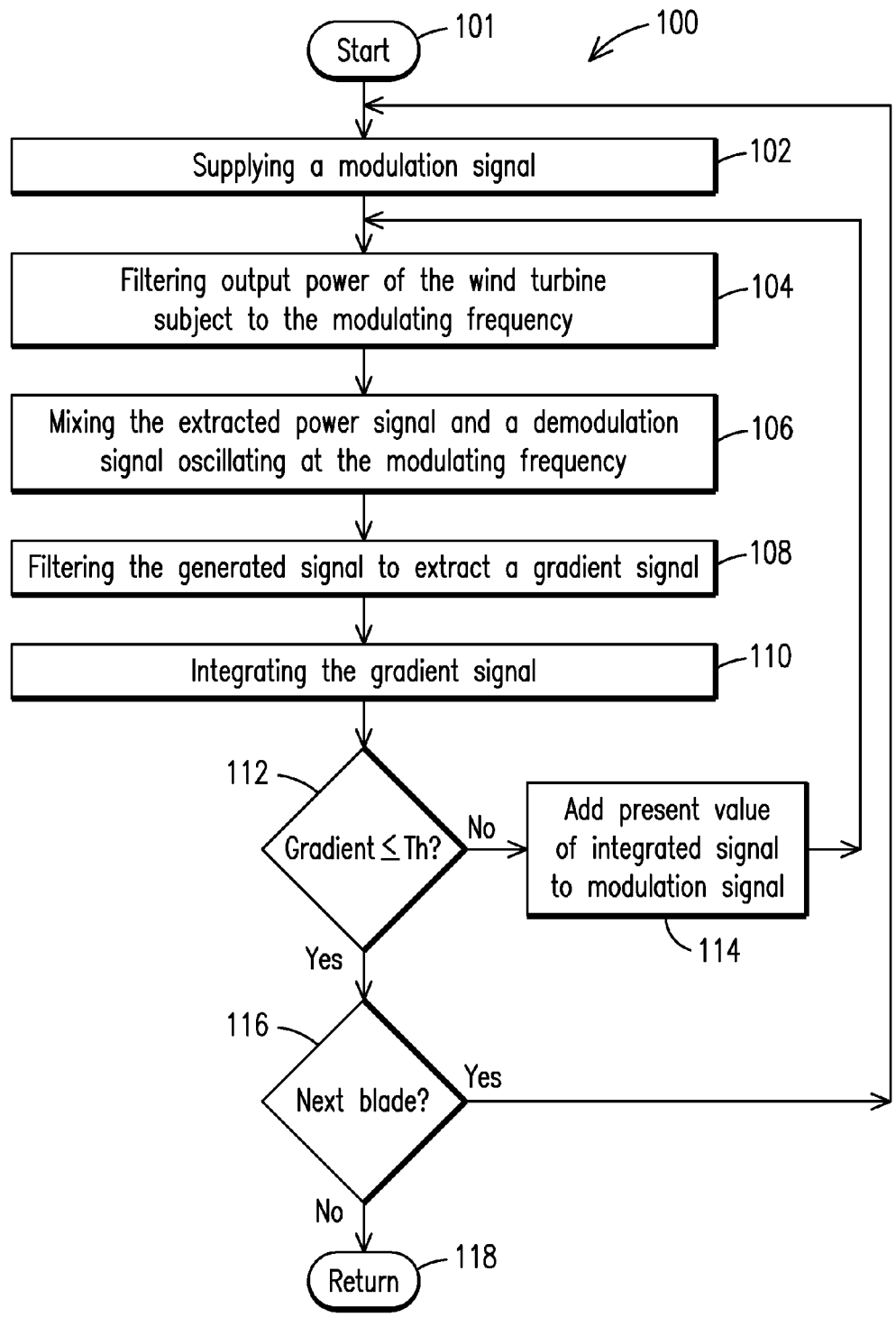
FIG. 3 is a flow chart of one example embodiment of a method to individually optimize respective pitch angles of a plurality of blades in a wind turbine.

FIG. 3 is a flow chart 100 of one example embodiment of a method to individually optimize respective pitch angles of a plurality of blades in a wind turbine. Subsequent to a start step 101, step 102 allows supplying a modulation signal 34 (FIG. 2) having a predefined modulating frequency (e.g., frequency f1) to modulate at the modulating frequency a pitch angle of a respective one of the plurality of blades being presently optimized. Step 104 allows filtering (e.g., high-pass filtering) output power of the wind turbine subject to the modulating frequency to extract a power signal in a frequency spectrum comprising at least the modulating frequency.

Step 106 allows mixing the extracted power signal and a demodulation signal 42 (FIG. 2) oscillating at the modulating frequency (e.g., frequency f1) to generate a signal comprising a product of the extracted power signal and the demodulation signal. As noted above, the signals being mixed, e.g., the high-pass filtered power signal and the demodulation signal, should have a substantially in-phase relationship between one another. Step 108 allows filtering (e.g., low-pass filtering) the generated signal to remove at least the modulating frequency and extract a gradient signal effective to search a pitch angle estimate conducive to optimize output power of the turbine. Step 110 allows integrating the gradient signal to cause the gradient signal to converge towards a value indicative of an optimal pitch angle for the respective one of the plurality of blades being presently optimized.

In one example embodiment, step 112 allows comparing the value of the integrated gradient signal relative to a predefined threshold value (Th). For example, further iterations may be needed to reach a zero or pre-determined near-zero value for the gradient signal and thus establish the optimal pitch angle for the respective one of the plurality of blades. The threshold value (Th) may be a numerical indication of how closely one may want to approach such zero value.

If the gradient signal is higher than threshold value (Th), step 114 allows adding a present value of the integrated gradient signal (or other defined amount) to the modulation signal to modulate an adjusted pitch angle at the modulating frequency and then iteratively performing steps 104 through 112 to meet the threshold value for the gradient signal and establish the optimal pitch angle for the respective one of the plurality of blades. Step 116 allows checking whether there is a further blade of the wind turbine that should be optimized next. If yes, then steps 102 through 112 may be performed next to establish the optimal pitch angle for the further blade. If there is no further blade that needs pitch angle optimization, then one proceeds to return step 118. Accordingly, flow chart 100 is one example embodiment of an adaptive control technique to sequentially optimize the individual pitch angles of a plurality of blades in a wind turbine.

Figure 4:
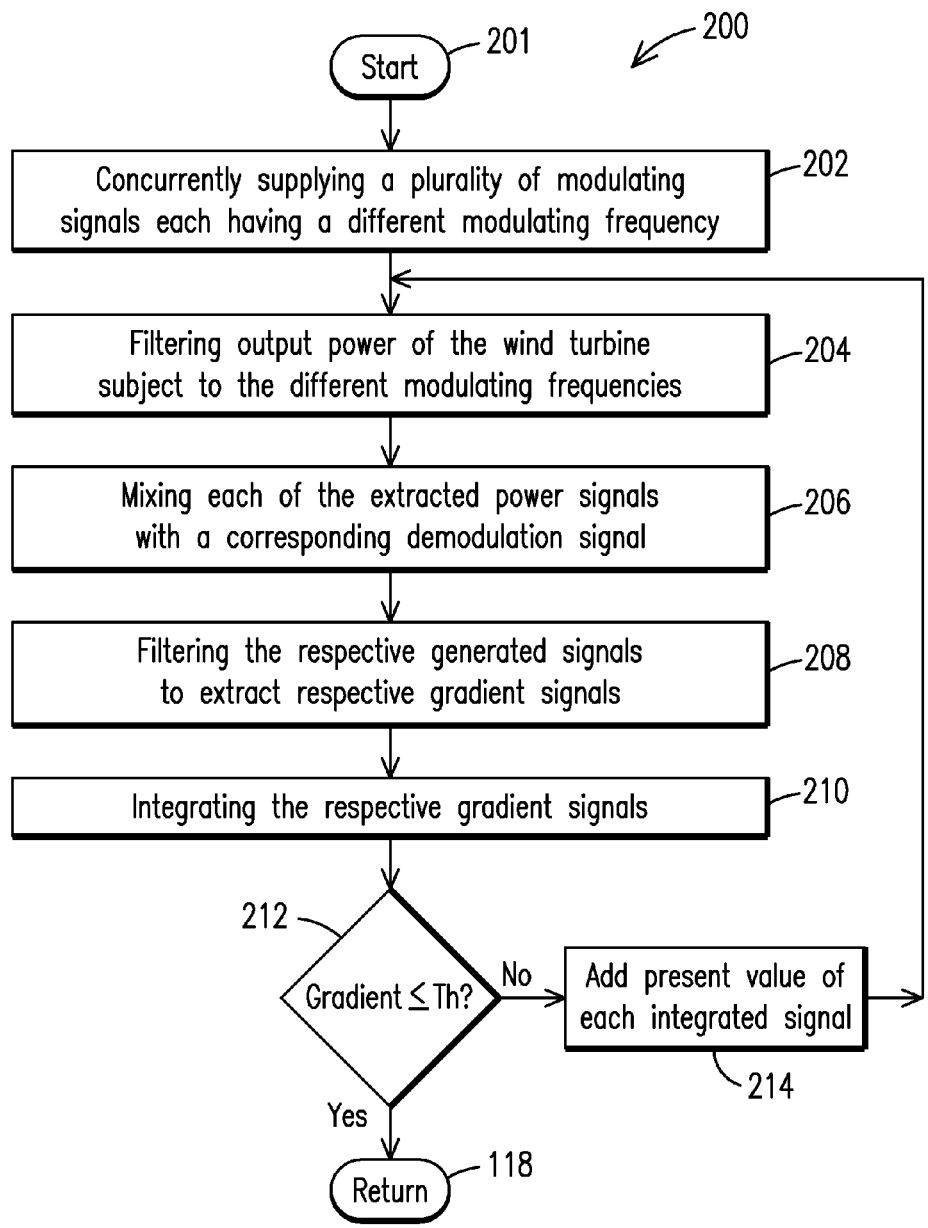
FIG. 4 is a flow chart of another example embodiment of a method to individually optimize respective pitch angles of a plurality of blades in a wind turbine.

FIG. 4 is a flow chart 200 of another example embodiment of a method to individually optimize respective pitch angles of a plurality of blades in a wind turbine. Subsequent to a start step 201, step 202 allows concurrently supplying a plurality of modulating signals each having a different modulating frequency to individually modulate at a respective different modulating frequency each respective pitch angle of the plurality of blades. In an example case of a wind turbine with three blades, such as blades B1, B2 and B3, the different modulating frequencies may be f1, f2 and f3. For example, modulating frequency f1 may be used to modulate the pitch angle of blade B1; modulating frequency f2 may be used to modulate the pitch angle of blade B2; and modulating frequency f3 may be used to modulate the pitch angle of blade B3. As elaborated in greater detail below, output power of the wind turbine subject to the different modulating frequencies may be processed to extract respective gradient signals effective to search respective pitch angle estimates conducive to optimize output power of the turbine.

The processing of output power of the wind turbine subject to the different modulating frequencies may involve the following: Step 204 allows filtering (e.g., high-pass filtering) the output power of the wind turbine subject to the different modulating frequencies to extract respective power signals in a frequency spectrum comprising at least the different modulating frequencies. Step 206 allows mixing each of the extracted power signals with a corresponding demodulation signal oscillating at a respective one of the different modulating frequencies to generate respective signals each comprising a product of a respective one of the extracted power signals and the corresponding demodulation signal. For example, the filtered power signal oscillating at frequency f1 would be mixed with a demodulating signal oscillating at frequency f1; the filtered power signal oscillating at frequency f2 would be mixed with a demodulating signal oscillating at frequency f2; and the filtered power signal oscillating at frequency f3 would be mixed with a demodulating signal oscillating at frequency f3. As noted above, the respective signals being mixed with one another, e.g., the extracted power signal and the demodulation signal should have a substantially in-phase relationship between one another.

Step 208 allows filtering (e.g., low-pass filtering) the respective generated signals to remove at least each different modulating frequency and extract respective gradient signals effective to search respective pitch angle estimates conducive to optimize output power of the turbine. Step 210 allows integrating the respective gradient signals to cause each gradient signal to converge towards respective values indicative of respective optimal pitch angles for each of the plurality of blades being concurrently optimized.

In one example embodiment, step 212 allows comparing the respective values of the gradient signals relative to a predefined threshold value (Th). For example, further iterations may be needed to reach a zero value for the respective gradient signals and thus establish the optimal pitch angles for blades B1, B2 and B3. The threshold value (Th) may be a numerical indication of how closely one may want to approach such zero value. If the respective values of the gradient signals are higher than threshold value (Th), step 214 allows adding a respective present value of each integrated gradient signal to the modulation signals to modulate at each different modulating frequency respective present values of pitch angles for the plurality of blades and then iteratively performing steps 204 through 212 to meet the threshold value for the gradient signals and establish the respective optimal pitch angles for each of the plurality of blades prior to return step 216. Accordingly, flow chart 200 is one example embodiment of a technique to contemporaneously optimize the individual pitch angles of a plurality of blades in a wind turbine.

In one example embodiment one may supply a modulating signal to modulate the pitch angle of a blade being optimized. One may process output power of the wind turbine to extract a gradient signal responsive to the modulating signal. The gradient signal may be integrated and the pitch angle may be changed in response to a value of the integrated gradient signal towards a value indicative of an optimal pitch angle for the blade being optimized. One may add the value of the integrated gradient signal to the modulation signal to modulate the changed pitch angle of the blade. Further iterations may be performed to reach or approximate a target value (e.g., zero value) for the gradient signal and thus establish the optimal pitch angle for the blade.

FIG. 5 is a plot of an example pitch angle signal 50 of an individual blade where the pitch is subject to a modulation signal (e.g., dithering) as a function of time. In this example, the pitch angle of the individual blade contains an initial pitch angle error of approximately three degrees, which is gradually reduced over time to practically zero.

FIG. 6 shows respective plots of an example modulating signal 52 and an example demodulating signal 54, which exhibit relatively close phase alignment relative to one another.

FIG. 7 is a plot of a high-pass filtered power signal 55, as may be extracted from HPF 36.

FIG. 8 shows respective plots of an example mixer output signal 56, as may be generated by mixer 38; and an example gradient signal 58 as may be extracted from LPF 44.

FIG. 9 is a plot of an integrated signal 60, as may be integrated by integrator 46 starting in this example at t=100 sec.

FIG. 10 is a plot of example output power 62 of the wind turbine, which is gradually increased as the pitch angle of the individual blade is optimized.

It will be appreciated that aspects of an example inventive system—as may be used to individually optimize respective pitch angles of a plurality of blades in a wind turbine—and methods disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc), which may include but is not limited to firmware, resident software, microcode, etc.

Furthermore, parts of the processor system can take the form of a computer program product accessible from a processor-usable or processor-readable medium providing program code for use by or in connection with a processor or any instruction execution system. Examples of processor-readable media may include non-transitory tangible processor-readable media, such as a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

While various embodiments of the present invention have been shown and described herein, it will be understood that such embodiments are provided by way of example only. Numerous variations, changes and substitutions may be made without departing from the invention herein. Accordingly, it is intended that the invention be limited only by the spirit and scope of the appended claims.

The invention claimed is:

1. A method to individually optimize respective pitch angles of a plurality of blades in a wind turbine, the method comprising:
   a) supplying a modulation signal having a predefined modulating frequency to modulate at the modulating frequency a pitch angle of only a respective one of the plurality of blades being presently optimized;
   b) filtering output power of the wind turbine subject to the modulating frequency to extract a power signal in a frequency spectrum comprising at least the modulating frequency;
   c) mixing the extracted power signal and a demodulation signal oscillating at the modulating frequency to generate a signal comprising a product of the extracted power signal and the demodulation signal;
   d) filtering the generated signal to remove at least the modulating frequency and extract a gradient signal effective to search a pitch angle estimate conducive to optimize output power of the turbine; and
   e) integrating the gradient signal to cause the gradient signal to converge towards a value indicative of an optimal pitch angle for the respective one of the plurality of blades being presently optimized.

2. The method of claim 1, wherein the modulation signal comprises a periodic signal.

3. The method of claim 1, wherein the modulation signal comprises a sinusoid.

4. The method of claim 1, wherein the modulation signal comprises a random signal.

5. The method of claim 1, further comprising: f) adding a present value of the integrated gradient signal to the modulation signal to modulate at the modulating frequency a present value of pitch angle for the respective one of the plurality of blades.

6. The method of claim 5, further comprising iteratively performing steps b) through f) to reach or approximate a zero value for the gradient signal and thus establish the optimal pitch angle for the respective one of the plurality of blades.

7. The method of claim 6, further comprising setting the respective one of the plurality of blades to the optimal pitch angle.

8. The method of claim 1, further comprising adjusting a gain for the integrated gradient signal.

9. The method of claim 1, wherein prior to the mixing step, estimating a difference in a phase angle of the extracted power signal relative to a phase angle of the demodulating signal.

10. The method of claim 9, compensating the estimated phase angle difference to provide a substantially in-phase relationship between the extracted power signal and the demodulation signal.

11. The method of claim 5, further comprising supplying the modulation signal to modulate a pitch angle of a further one of the plurality of blades of the wind turbine to be optimized next.

12. The method of claim 11, further comprising iteratively performing steps b) through f) to establish an optimal pitch angle for the further one of the plurality of blades.

13. The method of claim 1, wherein the supplying of the modulation signal comprises concurrently supplying a plurality of modulating signals at respective different modulating frequencies to simultaneously modulate at a respective different modulating frequency the pitch angle of each individual one of the plurality of blades, and concurrently performing at least one or more iterations to establish a respective optimal pitch angle for each one of the plurality of blades.

14. A method to individually optimize respective pitch angles of a plurality of blades in a wind turbine, the method comprising:
   concurrently supplying a plurality of modulating signals each having a different modulating frequency to individually modulate at a respective different modulating frequency the respective pitch angle of each individual one of the plurality of blades; and
   processing output power of the wind turbine to extract respective gradient signals responsive to the modulating signals to search respective pitch angle estimates conducive to optimize output power of the turbine.

15. The method of claim 14, wherein the processing of output power of the wind turbine further comprises:
   filtering output power of the wind turbine to extract respective power signals in a frequency spectrum comprising at least the different modulating frequencies;
   mixing each of the extracted power signals with a corresponding demodulation signal oscillating at a respective one of the different modulating frequencies to generate respective signals each comprising a product of a respective one of the extracted power signals and the corresponding demodulation signal; and
   filtering the respective generated signals to remove at least each different modulating frequency and extract the respective gradient signals.

16. The method of claim 15, further comprising integrating the respective gradient signals to cause each gradient signal to converge towards respective values indicative of respective optimal pitch angles for each of the plurality of blades being concurrently optimized.

17. The method of claim 16, further comprising adding a respective present value of each integrated gradient signal to the modulation signals to modulate at each different modulating frequency respective present values of pitch angles for the plurality of blades.

18. The method of claim 17, further comprising performing at least a further iteration of the processing of output power of the wind turbine to reach or approximate a zero value for the respective gradient signals and thus establish the respective optimal pitch angles for each of the plurality of blades.

19. A method to individually optimize a respective pitch angle of blades of a wind turbine, the method comprising:
   a) applying a modulation to a pitch angle of only one blade of a wind turbine;
   b) integrating a change in a power signal of the wind turbine responsive to the modulation;
   c) adjusting the pitch angle of the one blade in response to the integrated power signal;
   d) repeating steps a) through c) until the integrated power signal achieves a prede-termined value indicating that a desired optimal pitch angle has been achieved for the one blade; and
   e) repeating steps a) through d) for a further one of the blades of the wind turbine.

20. At least one non-transitory processor-readable storage medium comprising processor-readable code stored therein, which when executed by at least one processor, the computer-readable code causes the processor to perform the method of claim 19.

* * * * *